United States Patent Office 2,927,065
Patented Mar. 1, 1960

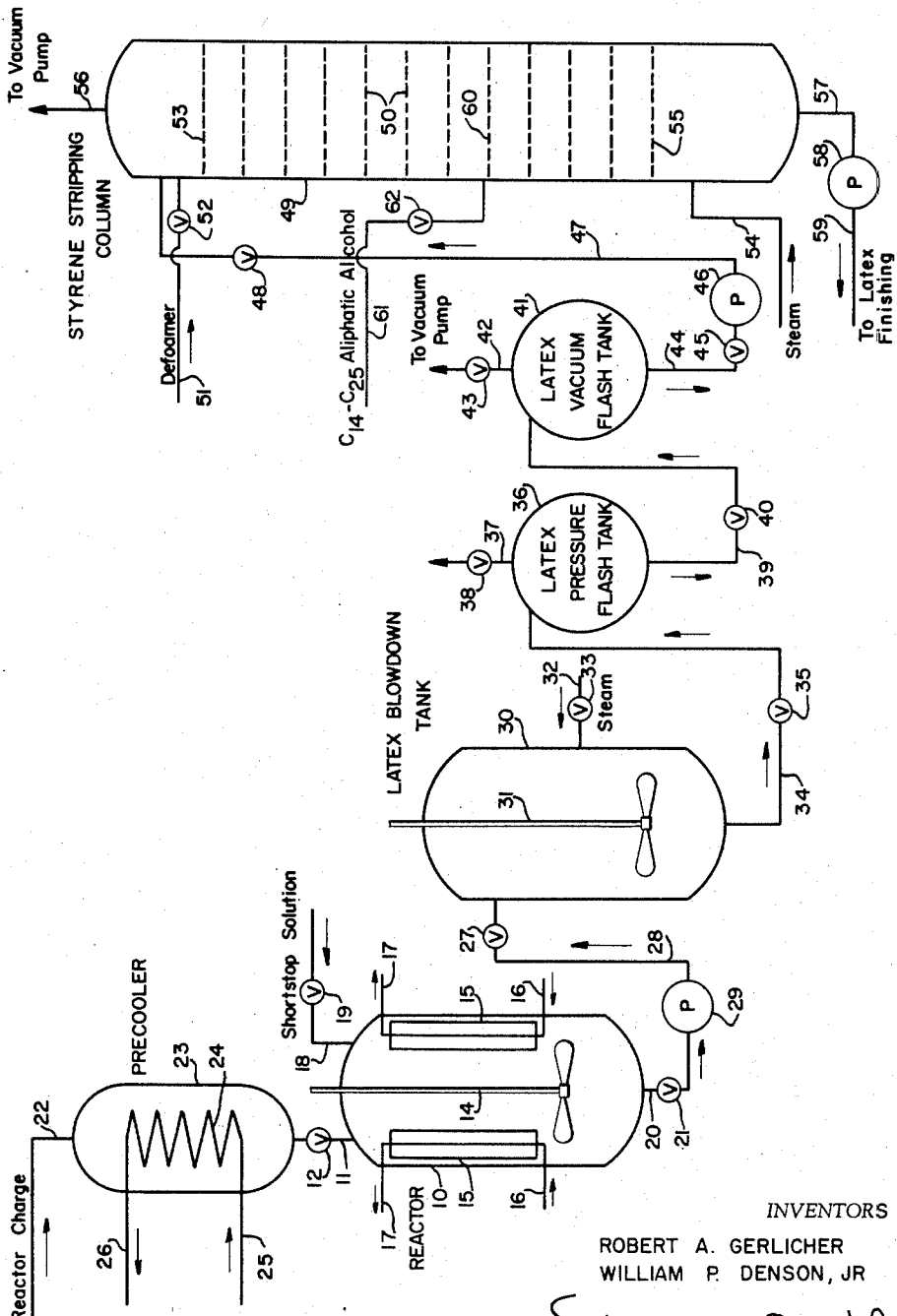

2,927,065

METHOD OF PROCESSING SYNTHETIC RUBBER LATEX

Robert A. Gerlicher and William P. Denson, Jr., Baton Rouge, La., assignors to Copolymer Rubber and Chemical Corporation, a corporation of Louisiana Application December 31, 1957, Serial No. 706,395

16 Claims. (Cl. 202—46)

This invention broadly relates to the processing of synthetic rubber latex and, in one of its more specific embodiments, to an improved method of separating distillable material from synthetic rubber latex whereby prefloc formation may be reduced.

The present invention will be described and illustrated herein with specific reference to a method of separating styrene from unstripped GR-S synthetic rubber latex using steam as a stripping agent. However, it will be recognized by those skilled in the art that the principles of the present invention are applicable to other methods of separating distillable material from synthetic rubber latex by means of a stripping gas wherein prefloc formation is a problem and it is desirable that prefloc formation be reduced.

Synthetic rubber latices may be prepared by processess well known in the art such as, for example, prior art processes wherein polymerizable material is emulsified in an aqueous medium by means of an emulsifying agent such as fatty acid soap or other suitable surface active agent, and then polymerized under suitable controlled reaction conditions in the presence of a catalyst and other regulating materials. The polymerization is generally "short-stopped" at a suitable stage before complete conversion of the monomer or monomers to polymer such as, for example, at about 60% conversion, and the unreacted monomer or monomers separated from the resulting unstripped latex by flashing and/or steam distillation. The stripped synthetic rubber latices so prepared may be concentrated to produce a commercial high solids synthetic rubber latex product, or coagulated by means of a suitable coagulant to produce solid synthetic rubber.

In an aqueous emulsion polymerization process for the preparation of synthetic rubber latex wherein the polymerization is short-stopped at a suitable stage before complete conversion of the monomeric material to polymer, when the synthetic rubber latex leaves the reactor considerable amounts of unreacted monomer or monomers are present in the swollen polymer particles of the latex. It is generally considered in the art that particles of polymer in the unstripped synthetic rubber latex are encompassed by a thin film of emulsifier which stabilizes and protects the polymer particles and that a large proportion of the unreacted monomer or monomers present in the latex is absorbed, dissolved in, or otherwise present within the swollen polymer particles. Thus, during a subsequent monomer recovery step following polymerization, the monomer or monomers present within the polymer particles must be withdrawn therefrom before recovery of unreacted monomeric material may be effected. This results in rupture of the encompassing protective film of emulsifier and the surfaces, or at least a portion of the surfaces, of the individual polymer particles are exposed and unprotected by the film of emulsifier. It is thought that such exposed and unprotected surfaces of two or more polymer particles are much more likely to fuse, thereby forming larger unstable polymer particles and resulting in prefloc formation.

Prefloc formation in latex stripping columns during separation of distillable material from synthetic rubber latex by means of a gaseous stripping agent is a well known and long standing problem in the art. The resulting prefloc not only lowers monomer utilization and reduces the yield of desired product, but also necessitates frequent expensive and time consuming cleaning of the column to remove the trough, tightly adhering deposits of prefloc from the trays and internal surfaces. For example, the styrene stripping columns most commonly used in the art are provided with perforated tray means for countercurrently contacting unstripped GR-S latex with steam. As prefloc forms within the stripping column, it deposits not only on the internal surfaces, but also plugs the holes in the perforated trays thereby preventing efficient contacting of the latex with steam and causing higher operating pressures with an accompanying increase in the operating temperature. With continued prefloc formation, eventually a point is reached where the stripping column must be taken off-stream and the profloc removed by a laborious and time consuming process. In modern latex stripping columns provided with 12 trays and when stripping with desuperheated steam, approximately 65–70 percent of the prefloc forms on the top three trays, with decreasing amounts forming on lower trays. The bottom trays usually have very little prefloc. Thus, it will be apparent that the rate of prefloc formation on the top three trays of the column largely determines the time interval between cleanings. It will be further apparent that if a method were provided for appreciably reducing prefloc formation in the upper portion of the column and particularly on the first three trays, then very substantial savings may be effected in loss of time when the latex stripping column is off-stream and labor expended in cleaning operations. However, prior to the present invention, a method of stripping distillable material from synthetic rubber latex by means of a gaseous stripping agent whereby prefloc formation may be substantially reduced has not been available to the art even though the need has been long recognized.

In accordance with the present invention, prefloc formation is greatly reduced while stripping distillable material from synthetic rubber latex with a gaseous stripping agent by passing a higher aliphatic alcohol having a carbon chain of about 14–25 carbon atoms into the stripping column at a point intermediate the latex feed and the stripping gas feed. It is essential that the alcohol be fed to the stripping column in the above manner since it is ineffective in reducing prefloc formation when fed at or above the latex feed point, or at or below the stripping gas feed point and, preferably, the alcohol should be fed to the stripping column at a point remote from the latex and stripping gas feed points. The method of the present invention is particularly effective in reducing prefloc formation in the upper portion of the column where the largest amount of prefloc forms, thereby allowing greatly extended periods of operation between cleanings of the column and substantially improving the yield of desired product.

It is an object of the present invention to provide an improved method of separating distillable material from synthetic rubber latex by means of a stripping gas whereby prefloc formation is reduced.

It is still a further object of the present invention to provide an improved method of separating styrene from synthetic rubber latex by steam distillation whereby prefloc formation is reduced.

It is still a further object of the present invention to provide an improved method of operating a stripping column whereby distillable material may be separated from synthetic rubber latex by means of a stripping gas with a minimum of prefloc formation on surfaces within the column.

It is still a further object of the present invention to provide an improved method of operating a stripping column whereby styrene may be separated from synthetic rubber latex by steam distillation with a minimum of prefloc formation on surfaces within the column.

Still other objects of the present invention and the attendant advantages will be apparent to those skilled in the art by reference to the following detailed description and the drawing, which diagrammatically illustrates one suitable arrangement of apparatus for preparing butadiene-styrene synthetic rubber latex and separating unreacted styrene therefrom in accordance with the present invention.

Referring now to the drawing, the reactor 10 is a pressure vessel suitable for use in polymerizing butadiene and styrene to form synthetic rubber latex by an emulsion polymerization process. The reactor 10 may be provided with an inlet conduit 11 including normally closed control valve 12 for charging reactants and other ingredients comprising a prior art recipe for GR–S synthetic rubber latex, an agitator 14 which is so constructed and arranged as to assure adequate agitation of the contents, conventional means for controlling the polymerization temperature which may include tube bundles 15 and conduits 16 and 17 for supplying to and withdrawing from, respectively, a controlled quantity of liquefied ammonia or other suitable coolant to maintain a desired polymerization temperature, conduit 18 including normally closed control valve 19 for supplying short-stop solution to the contents when the desired percent conversion of monomers to polymers is reached and thereby terminate the polymerization, and outlet conduit 20 including normally closed control valve 21 for withdrawing prepared unstripped synthetic rubber latex. When charging reactor 10, valve 12 in conduit 11 is opened and the reactants and other ingredients comprising a prior art GR–S recipe including butadiene, styrene, soap solution, water, initiators or catalysts and regulators or modifiers may be charged to reactor 10 in the usual sequence and desired quantities through conduit 22, precooler 23 and conduit 11. If desired, all of the ingredients except the catalyst solution and a portion of the water may be charged simultaneously to reactor 10 with agitation. Then, the catalyst solution may be charged to reactor 10 followed by the remaining water. A suitable coolant such as cold water at about 33° F. may be supplied to and withdrawn from cooling coil 24 in precooler 23 via conduits 25 and 26, respectively, for the purpose of precooling the reactants and other ingredients charged to reactor 10 to a desired temperature, preferably to a temperature in the vicinity of the polymerization temperature such as about 40–45° F., and thereby reduce the initial thermal load on the temperature control means which may be provided for reactor 10.

After charging reactor 10, valve 12 in conduit 11 is closed and the polymerization may be allowed to proceed with agitation of the reactor contents and close control of the polymerization temperature, preferably at a temperature of about 41° F., until the desired percent conversion of monomers to polymer is reached. The initial reactor pressure of about 10 p.s.i.g. decreases somewhat as the polymerization proceeds due to reaction of a portion of the butadiene. At a suitable stage, e.g., when about 60% by weight of the total weight of the butadiene and styrene charged to reactor 10 is converted to polymer, the polymerization is terminated, i.e., "short-stopped" by opening valve 19 and supplying via conduit 18 an aqueous solution of sodium dimethyldithiocarbamate and sodium polysulfide or other suitable short-stop solution to the contents of reactor 10. The short-stop solution is blended with the unstripped GR–S synthetic rubber latex contents of reactor 10 and then valves 21 and 27 in conduits 20 and 28, respectively, are opened and the unstripped latex is transferred by means of pump 29 via conduits 20 and 28 from reactor 10 to latex blowdown tank 30. The valve in conduit 28 is closed after transfer of the unstripped latex.

The latex blowdown tank 30 may be provided with a suitably arranged agitator 31 for agitating the contents, conduit 32 including control valve 33 for supplying desuperheated steam, and conduit 34 including control valve 35 for withdrawing the contents. If desired, means also may be provided for recovering a portion of the unreacted butadiene content of the unstripped latex. While the unstripped latex containing as unreacted monomers about 40% by weight of the total weight of butadiene and styrene charged to reactor 10 is within latex blowdown tank 30, it may be warmed with agitation to a suitable temperature such as 120° F. by means of desuperheated steam supplied via conduit 32 and opened valve 33 at a pressure of about 60 p.s.i.g. or other suitable pressure. Warming of the latex in this manner results in a pressure such as about 40 p.s.i.g. within latex blowdown tank 30 and, since the pressure within latex pressure flash tank 36 is maintained at an appreciably lower pressure, upon opening valve 35 the unstripped latex may be transferred via conduit 34 at a desired flow rate by differential pressure from latex blowdown tank 30 to latex pressure flash tank 36.

The latex pressure flash tank 36 is provided with conduit 37 including control valve 38 for withdrawing vaporized butadiene, and conduit 39 including control valve 40 for withdrawing partially stripped latex. A suitable pressure such as about 2 p.s.i.g. is maintained within latex pressure flash tank 36. Under the prevailing temperature and pressure conditions, a major proportion of the unreacted butadiene content is vaporized and removed via conduit 37 upon opening control valve 38. The butadiene vapors thus removed may be liquefied and recycled for charging to reactor 10, if desired.

After a sufficient residence time in latex pressure flash tank 36 to remove a major proportion of the unreacted butadiene, the latex is withdrawn via conduit 39 upon opening valve 40 and passed at a desired flow rate to latex vacuum flash tank 41. Inasmuch as latex vacuum flash tank 41 is maintained at a suitable reduced pressure such as about 188 mm./Hg absolute by means of a vacuum maintained on conduit 42 including opened control valve 43, the latex may be transferred by differential pressure and without the need for pumping means. During residence within latex vacuum flash tank 41, all but very small amounts of the remaining unreacted butadiene content of the latex is vaporized and the vapors removed via conduit 42. The additional unreacted butadiene vapors thus separated may be liquefid and recycled for charging to reactor 10, if desired. The temperature of the latex is lowered somewhat largely due to vaporization of the unreacted butadiene content as it is passed through latex pressure and vacuum flash tanks 36 and 41. For example, when the temperature of the latex feed to latex pressure flash tank 36 is about 120° F., then the temperature of the latex upon withdrawal from vacuum flash tank 41 generally is in the vicinity of about 90° F. The partially stripped latex containing only relatively small or trace amounts of the original unreacted butadiene content and substantially all of the unreacted styrene is withdrawn from latex vacuum flash tank 41 via conduit 44 upon opening valve 45. The latex is then pumped by means of pump 46 via conduit 47 and open valve 48 to the upper portion of styrene stripping column 49 at a controlled feed rate such as about 70–80 g.p.m.

The styrene stripping column 49 may be of a conventional "Standard Government Plant" design and provided with a plurality of suitably arranged perforated trays 50, a conduit 51 including control valve 52 for feeding defoamer to top tray 53, and conduit 54 for supplying desuperheated steam to the lower portion of the column, such as below bottom tray 55. The styrene stripping column 49 is operated under a suitable reduced pressure such as approximately 80 mm./Hg absolute by means of a vacuum maintained on conduit 56. The partially stripped latex feed entering at top tray 53 passes downward over the lower trays and through styrene stripping column 49 in countercurrent relationship with desuperheated steam supplied via conduit 54, the steam passing upward through the openings in perforated trays 50 and assuring intimate contact therewith. Simultaneously, methyl silicone defoamer, such as Dow-Corning Antifoam A or other suitable defoamer, is fed to top tray 53 via conduit 51 and opened control valve 52 for the purpose of suppressing foam and preventing operational problems arising from foaming of the latex. In addition, a higher aliphatic alcohol having a carbon chain of about 14–25 carbon atoms and preferably in the form of an aqueous dispersion is passed to tray 60 of styrene stripping column 49 via conduit 61 at a rate controlled by valve 62 for the purpose of reducing prefloc formation within styrene stripping column 49. The styrene stripping column 49 may be operated at a temperature varying from about 120–130° F. at the top of the column to about 140–165° F. at the bottom of the column, with the pressure at any given point in the column being in equilibrium with the temperature. As the partially stripped latex feed passes downward through styrene stripping column 49, the remaining traces of unreacted butadiene and the unreacted styrene content is separated by steam distillation, and the resulting butadiene and styrene vapors together with the steam content is withdrawn via conduit 56. If desired, the butadiene and styrene content may be recovered from the withdrawn vapors for recycle to reactor 10.

The resulting stripped GR–S latex containing substantially no unreacted butadiene and only very small or trace amounts of styrene is withdrawn from styrene stripping column 49 via conduit 57 and, if desired, forced by means of pump 58 via conduit 59 to a subsequent latex finishing operation. For example, the resulting stripped latex may be concentrated by a prior art process to a commercial high solids synthetic rubber latex product.

As previously mentioned, it is an important feature of the present invention to provide a method of stripping distillable material from synthetic rubber latex by means of a stripping gas whereby prefloc formation is reduced, and particularly in the upper portion of the stripping column such as on the top three trays. In accordance with the present invention, this may be accomplished only of the higher aliphatic alcohol having a carbon chain of about 14–25 carbon atoms is passed into the stripping column at a point intermediate the latex and stripping gas feeds. Otherwise, the alcohol is ineffective in reducing prefloc formation in the stripping column. Better results may be obtained when the alcohol is fed to an intermediate portion of the stripping column substantially removed from the feed points of latex and stripping gas. For example, the alcohol feed preferably should be below the top trays where relatively large amounts of prefloc form and sufficiently above the feed point of stripping gas to assure that an effective amount of the alcohol will be passed upward through the column due to contact with the stripping gas rather than remaining in the latex and being withdrawn with the stripped latex. In most instances, feeding the alcohol to about the 5th tray above the point of stripping gas feed will give excellent results regardless of the height of the stripping column. When steam distilling syrene from synthetic rubber latex using a stripping column similar to that specifically described herein, the alcohol preferably should be fed to a portion of the stripping column about midway between the latex and steam feeds, e.g., at about the 5th tray from the bottom of the column.

In general, any suitable higher aliphatic alcohol having a carbon chain of about 14–25 carbon atoms may be used in practicing the present invention. However, better results are usually obtained when using a suitable higher aliphatic alcohol having a carbon chain of about 16–18 carbon atoms. Cetyl alcohol, stearyl alcohol and mixtures thereof have been found to give highly satisfactory results and are preferred in most instances. The amount of alcohol supplied to the latex stripping column in practicing the present invention may vary over a considerable range. About 0.001 part by weight of alcohol for each 100 parts by weight of latex solids fed to the latex stripping column will generally result in an appreciable reduction in prefloc formation, but amounts much larger than this may be used since the upper limit appears to be largely economic in nature. For example, about 0.001–2.0 parts by weight of alcohol for each 100 parts by weight of latex solids fed to the latex stripping column give very satisfactory results. About 0.005–0.5 part of alcohol by weight for each 100 parts by weight of latex solids fed to the latex stripping column generally gives even better results and is preferred. The amount of alcohol is based upon each 100 parts by weight of latex solids fed to the stripping column. In the specification and claims, when determining the weight of latex solids for the purpose of arriving at the amount of alcohol to be fed to the stripping column, the weight of latex solids is defined as the weight of the polymer, soap and other non-volatile substances which are present in the latex feed to the stripping column.

The higher aliphatic alcohols having a carbon chain of about 14–25 carbon atoms are solids which are substantially insoluble in an aqueous medium. In view of this, the alcohol preferably is fed to the latex stripping column in the form of an aqueous dispersion. The aquous dispersion may be prepared in any suitable manner. For example, the normally solid alcohol may be reduced to a finely divided state and added with agitation to water containing a surface active agent such as a suitable fatty acid soap and/or alkyl aryl sulfonate which does not adversely affect the latex. The concentration of alcohol in the dispersion thus prepared generally is not of importance, but usually about a 0.5% dispersion is preferred for practical reasons. Warming of the water to about 170° F. often facilitates preparation of the dispersion and this may be desirable in some instances. Once the dispersion is prepared, it may be fed to the latex stripping column at a flow rate which, at the given concentration of alcohol in the dispersion, is sufficient to result in a feed of alcohol within the desired weight range of alcohol for each 100 parts of synthetic rubber latex solids being fed to the stripping column.

Examples of polymerizable material which may be used in preparing synthetic rubber latices for processing in accordance with the present invention are mixtures of a 1,3-butadiene such as 1,3-butadiene, 2-methyl-1,3-butadiene, 2-chloro-1,3-butadiene, 2,3-dimethyl-1,3-butadiene and piperylene, with another polymerizable compound which is capable of forming rubbery copolymers with such 1,3-butadienes such as styrene, alpha methyl styrene, vinyl naphthalene, etc. The preferred polymerizable material for many commercial applications is a mixture of butadiene and styrene wherein the styrene content of the mixture, by weight, is less than 70%.

The foregoing detailed discussion and the following specific example are for the purpose of illustration only, and are not intended as limiting to the spirit or scope of the appended claims.

*Example*

A "cold rubber" GR–S latex was prepared and processed using apparatus as illustrated in the drawing and described herein. Conventional reaction conditions and procedures were followed except as noted hereinafter. The recipe was as follows:

| Ingredient | Parts by Weight |
| --- | --- |
| Water | 200 |
| Butadiene | 70 |
| Styrene | 30 |
| Emulsifier (Fatty acid soap) | 4.5 |
| Secondary Emulsifier (Alkyl Aryl Sulfonate) | 0.15 |
| Electrolyte (Tri-sodium phosphate) | 0.5 |
| Ferrous sulfate | 0.018 |
| Chelating Agent (Ethylenediamine Tetra-acetic Acid Tetasodium Salt) | 0.027 |
| Sodium Formaldehydesulfoxylate | 0.07 |
| Hydroperoxide (paramenthane hydroperoxide, diisopropylbenzene monohydroperoxide) | 0.06 |
| Sulfole as a modifier (Technical Tert-dodecyl mercaptan) | 0.18 |

The ingredients were precooled to 40–45° F. prior to changing to the reactor, and then polymerized at a temperature of 41° F. At 60% conversion, the polymerization was short-stopped with a solution containing about 0.10 parts by weight of sodium dimethyldithiocarbamate and sodium polysulfide.

The unstripped latex was withdrawn from the reactor and passed to a blowdown tank. After warming to about 120° F. with desuperheated steam, the latex was passed to a pressure flash tank maintained at a pressure of 2 p.s.i.g. where a major amount of the unreacted butadiene was flashed off. All but traces of the remaining unreacted butadiene was recovered by passing the latex to a vacuum flash tank maintained at 188 mm./Hg absolute.

The following general procedure was followed in operating the styrene stripping column. The partially stripped latex was withdrawn from the vacuum flash tank at a temperature of about 90° F. and passed to the styrene stripping column at a flow rate of 75 g.p.m. A sufficient amount of a defoamer was fed to the top of the stripping column to suppress foam. Desuperheated steam at 15 p.s.i.g. was fed to the bottom of the column at a rate of 5600 lbs./min. Under these conditions, the temperature at the top and bottom of the column was 126° F. and 140° F., respectively, when the column was clean, but increased to a maximum top and bottom temperature of 130° F. and 162° F., respectively, before taking the stripping column off-stream for cleaning purposes. When it was necessary, the column was taken off-stream and cleaned, with the weight of prefloc being determined.

In one series of runs, the stripping column was operated as in the general procedure above described with the exception of 0.0013 part of stearyl alcohol in the form of an aqueous dispersion being added at the top tray. In a second series of runs, the stripping column was operated following the above general procedure with the exception of passing 0.0013 part of stearyl alcohol in the form of an aqueous dispersion into the stripping column at the fifth tray from the bottom. The following data were obtained:

| Addition of 0.0013 part of Stearyl Alcohol at point of Latex Feed (% prefloc based on polymer) | Addition of 0.0013 part of Stearyl Alcohol at 5th tray from Bottom of Column (% prefloc based on polymer) |
| --- | --- |
| 0.21 | 0.11 |
| 0.19 | 0.12 |
| 0.19 | 0.10 |
| 0.21 | 0.11 |

From the above data, it is apparent that operating in accordance with the present invention results in a marked reduction in prefloc formation within the stripping column. When no stearyl alcohol was added, substantially identical data were obtained as above illustrated for stearyl alcohol added to the top tray. Thus, it is apparent that the addition of stearyl alcohol at the top tray was ineffective in reducing prefloc formation. When quantities of stearyl alcohol greater than 0.0013 part, such as 0.0046 part or more, were added to the fifth tray from the bottom of the column, even greater improvement in reducing prefloc formation was noted.

What is claimed is:

1. A method of separating distillable material from synthetic rubber latex comprising passing synthetic rubber latex containing distillable material into an upper portion of a column, passing a stripping gas into a lower portion of the column, stripping at least a portion of the distillable material from the synthetic rubber latex by countercurrently contacting the latex with the stripping gas, reducing prefloc formation in at least a portion of the column by passing a small but effective amount to reduce prefloc formation of at least one higher aliphatic alcohol having a carbon chain of about 14–25 carbon atoms into an intermediate portion of the column substantially removed from the latex and stripping gas feed points, withdrawing stripping gas containing vapors of the distillable material from the column, and withdrawing from the column synthetic rubber latex having at least a portion of the distillable material separated therefrom.

2. A method of separating distillable material from synthetic rubber latex comprising passing synthetic rubber latex containing distillable material into an upper portion of a column, passing a stripping gas into a lower portion of the column, stripping at least a portion of the distillable material from the synthetic rubber latex by countercurrently contacting the latex with the stripping gas, reducing prefloc formation in at least a portion of the column by passing about 0.001–2.0 parts by weight for each 100 parts by weight of latex solids passed into the column of at least one higher aliphatic alcohol having a carbon chain of about 14–25 carbon atoms into an intermediate portion of the column substantially removed from the latex and stripping gas feed points, withdrawing stripping gas containing vapors of the distillable material from the column, and withdrawing from the column synthetic rubber latex having at least a portion of the distillable material separated therefrom.

3. A method of separating distillable material from synthetic rubber latex comprising passing synthetic rubber latex containing distillable material into an upper portion of a column, passing a stripping gas into a lower portion of the column, stripping at least a portion of the distillable material from the synthetic rubber latex by countercurrently contacting the latex with the stripping gas, reducing prefloc formation in at least a portion of the column by passing a small but effective amount to reduce prefloc formation of at least one higher aliphatic alcohol selected from the class consisting of cetyl alcohol and stearyl alcohol into an intermediate portion of the column substantially removed from the latex and stripping gas feed points, withdrawing stripping gas containing vapors of the distillable material from the column, and withdrawing from the column synthetic rubber latex having at least a portion of the distillable material separated therefrom.

4. A method of separating distillable material from synthetic rubber latex comprising passing synthetic rubber latex containing distillable material into an upper portion of a column, passing a stripping gas into a lower portion of the column, stripping at least a portion of the distillable material from the synthetic rubber latex by countercurrently contacting the latex with the stripping gas, reducing prefloc formation in at least a portion of the column by passing about 0.001–2.0 parts by weight for each 100 parts by weight of latex solids passed into the column of at least one higher aliphatic alcohol selected from the class consisting of cetyl alcohol and stearyl alcohol into an intermediate portion of the column substantially removed from the latex and stripping gas feed points, withdrawing stripping gas containing vapors of the distillable material from the column, and withdrawing from the column synthetic rubber latex having at least a portion of the distillable material separated therefrom.

5. A method of separating a distillable material from synthetic rubber latex comprising passing synthetic rubber latex containing distillable material into an upper portion of a column, passing a stripping gas into a lower portion of the column, stripping at least a portion of the distillable material from the synthetic rubber latex by countercurrently contacting the latex with the stripping gas, reducing prefloc formation in at least a portion of the column by passing a small but effective amount to reduce prefloc formation of at least one higher aliphatic alcohol having a carbon chain of about 14–25 carbon atoms into a portion of the column about midway between the upper and lower portions, withdrawing stripping gas containing vapors of the distillable material from the column, and withdrawing from the column synthetic rubber latex having at least a portion of the distillable material separated therefrom.

6. A method of separating distillable material from synthetic rubber latex comprising passing synthetic rubber latex containing distillable material into an upper portion of a column, passing a stripping gas into a lower portion of the column, stripping at least a portion of the distillable material from the synthetic rubber latex by countercurrently contacting the latex with the stripping gas, reducing prefloc formation in at least a portion of the column by passing about 0.001–2.0 parts by weight for each 100 parts by weight of latex solids passed into the column of at least one higher aliphatic alcohol having a carbon chain of about 14–25 carbon atoms into a portion of the column about midway between the upper and lower portions, withdrawing stripping gas containing vapors of the distillable material from the column, and withdrawing from the column synthetic rubber latex having at least a portion of the distillable material separated therefrom.

7. A method of separating distillable material from synthetic rubber latex comprising passing synthetic rubber latex containing distillable material into an upper portion of a column, passing a stripping gas into a lower portion of the column, stripping at least a portion of the distillable material from the synthetic rubber latex by countercurrently contacting the latex with the stripping gas, reducing prefloc formation in at least a portion of the column by passing a small but effective amount to reduce prefloc formation of at least one higher aliphatic alcohol selected from the class consisting of cetyl alcohol and stearyl alcohol into a portion of the column about midway between the upper and lower portions, withdrawing stripping gas containing vapors of the distillable material from the column, and withdrawing from the column synthetic rubber latex having at least a portion of the distillable material separated therefrom.

8. A method of separating distillable material from synthetic rubber latex comprising passing synthetic rubber latex containing distillable material into an upper portion of a column, passing a stripping gas into a lower portion of the column, stripping at least a portion of the distillable material from the synthetic rubber latex by countercurrently contacting the latex with the stripping gas, reducing prefloc formation in at least a portion of the column by passing about 0.001–2.0 parts by weight for each 100 parts by weight of latex solids passed into the column of at least one higher aliphatic alcohol selected from the class consisting of cetyl alcohol and stearyl alcohol into a portion of the column about midway between the upper and lower portions, withdrawing stripping gas containing vapors of the distillable material from the column, and withdrawing from the column synthetic rubber latex having at least a portion of the distillable material separated therefrom.

9. A method of separating styrene from synthetic rubber latex comprising passing synthetic rubber latex containing styrene into an upper portion of a column, passing steam into a lower portion of the column, steam distilling at least a portion of the styrene from the synthetic rubber latex by countercurrently contacting the latex with the steam, reducing prefloc formation in at least a portion of the column by passing a small but effective amount to reduce prefloc formation of at least one higher aliphatic alcohol having a carbon chain of about 14–25 carbon atoms into an intermediate portion of the column substantially removed from the latex and steam feed points, withdrawing steam containing styrene vapors from the column, and withdrawing from the column synthetic rubber latex having at least a portion of the with the steam, reducing prefloc formation in at least styrene content separated therefrom.

10. A method of separating styrene from synthetic rubber latex comprising passing synthetic rubber latex containing styrene into an upper portion of a column, passing steam into a lower portion of the column, steam distilling at least a portion of the styrene from the synthetic rubber latex by countercurrently contacting the latex with the steam, reducing prefloc formation in at least a portion of the column by passing about 0.001–2.0 parts by weight for each 100 parts by weight of latex solids passed into the stripping column of at least one higher aliphatic alcohol having a carbon chain of about 14–25 carbon atoms into an intermediate portion of the column substantially removed from the latex and steam feed points, withdrawing steam containing styrene vapors from the column, and withdrawing synthetic rubber latex having at least a portion of the styrene content separated therefrom.

11. A method of separating styrene from synthetic rubber latex comprising passing synthetic rubber latex containing the styrene into an upper portion of a column, passing steam into a lower portion of the column, steam distilling at least a portion of the styrene from the synthetic rubber latex by countercurrently contacting the latex with the steam, reducing prefloc formation in at least a portion of the column by passing a small but effective amount to reduce prefloc formation of at least one higher aliphatic alcohol selected from the class consisting of cetyl alcohol and stearyl alcohol into an intermediate portion of the column substantially removed from the latex and steam feed points, withdrawing steam containing styrene vapors from the column, and withdrawing from the column synthetic rubber latex having at least a portion of the styrene content separated therefrom.

12. A method of separating styrene from synthetic rubber latex comprising passing synthetic rubber latex containing styrene into an upper portion of a column, passing steam into a lower portion of the column, steam distilling at least a portion of the styrene from the synthetic rubber latex by countercurrently contacting the latex with the steam, reducing prefloc formation in at least a portion of the column by passing about 0.005–0.5 part by weight for each 100 parts by weight of latex solids passed into the column of at least one higher aliphatic alcohol selected from the class consisting of cetyl alcohol and stearyl alcohol into an intermediate portion of the column substantially removed from the latex and steam feed points, withdrawing steam containing styrene vapors from the column, and withdrawing from the column synthetic rubber latex having at least a portion of the styrene content separated therefrom.

13. A method of separating styrene from synthetic rubber latex comprising passing synthetic rubber latex containing styrene into an upper portion of a column, passing steam into a lower portion of the column, steam distilling at least a portion of the styrene from the synthetic rubber latex by countercurrently contacting the latex with the steam, reducing prefloc formation in at least a portion of the column by passing a small but effective amount to reduce prefloc formation of at least one higher aliphatic alcohol having a carbon chain of about 14–25 carbon atoms into a portion of the column about midway between the upper and lower portions, withdrawing steam containing styrene vapors from the column, and withdrawing synthetic rubber latex having at least a portion of the styrene content separated therefrom.

14. A method of separating styrene from synthetic rubber latex comprising passing synthetic rubber latex containing styrene into an upper portion of a column, passing steam into a lower portion of the column, steam distilling at least a portion of the styrene from the synthetic rubber latex by countercurrently contacting the latex with the steam, reducing prefloc formation in at least a portion of the column by passing about 0.001–2.0 parts by weight for each 100 parts by weight of latex solids passed into the column of at least one higher aliphatic alcohol having a carbon chain of about 14–25 carbon atoms into a portion of the column about midway between the upper and lower portions, withdrawing steam containing styrene vapors from the column, and withdrawing synthetic rubber latex having at least a portion of the sytrene content separated therefrom.

15. A method of separating styrene from synthetic rubber latex comprising passing synthetic rubber latex containing styrene into an upper portion of a column, passing steam into a lower portion of the column, steam distilling at least a portion of the styrene from the synthetic rubber latex by countercurrently contacting the latex with the steam, reducing prefloc formation in at least a portion of the column by passing a small but effective amount to reduce prefloc formation of at least one higher aliphatic alcohol selected from the class consisting of cetyl alcohol and stearyl alcohol into a portion of the column about midway between the upper and lower portions, withdrawing steam containing styrene vapors from the column, and withdrawing synthetic rubber latex having at least a portion of the styrene content separated therefrom.

16. A method of separating styrene from synthetic rubber latex comprising passing synthetic rubber latex containing styrene into an upper portion of a column, passing steam into a lower portion of the column, steam distilling at least a portion of the styrene from the synthetic rubber latex by countercurrently contacting the latex with the steam, reducing prefloc formation in at least a portion of the column by passing 0.005–0.5 part by weight for each 100 parts by weight of latex solids passed into the column of at least one higher aliphatic alcohol selected from the class consisting of cetyl alcohol and stearyl alcohol into a portion of the column about midway between the upper and lower portions, withdrawing steam containing styrene vapors from the column, and withdrawing synthetic rubber latex having at least a portion of the styrene content separated therefrom.

References Cited in the file of this patent

UNITED STATES PATENTS

| | | |
|---|---|---|
| 2,362,052 | Craig | Nov. 7, 1944 |
| 2,433,060 | Ohsol et al. | Dec. 23, 1947 |
| 2,514,207 | Johnson | July 4, 1950 |
| 2,615,010 | Troyan | Oct. 21, 1952 |